(12) United States Patent
Boshernitzan et al.

(10) Patent No.: US 10,108,247 B2
(45) Date of Patent: Oct. 23, 2018

(54) METHOD FOR REGULATING A SYSTEM FOR CONTROLLING A TERMINAL DEVICE

(71) Applicant: Swan Solutions Inc., Houston, TX (US)

(72) Inventors: Yaniv Boshernitzan, Houston, TX (US); Ohad Nezer, Houston, TX (US)

(73) Assignee: Swan Solutions, Inc., Austin, TX (US)

( * ) Notice: Subject to any disclaimer, the term of this patent is extended or adjusted under 35 U.S.C. 154(b) by 0 days.

(21) Appl. No.: 15/068,401

(22) Filed: Mar. 11, 2016

(65) Prior Publication Data

US 2016/0266636 A1    Sep. 15, 2016

Related U.S. Application Data

(60) Provisional application No. 62/131,575, filed on Mar. 11, 2015.

(51) Int. Cl.
*G06F 1/32* (2006.01)
(52) U.S. Cl.
CPC .......... *G06F 1/3243* (2013.01); *G06F 1/3231* (2013.01); *Y02D 10/152* (2018.01); *Y02D 10/173* (2018.01)

(58) Field of Classification Search
CPC .. G06F 1/325; G08C 2201/30; G08C 2201/42
See application file for complete search history.

(56) References Cited

U.S. PATENT DOCUMENTS

| 5,971,761 A | 10/1999 | Tillman, Sr. |
| 8,228,315 B1 | 7/2012 | Starner et al. |
| 8,788,978 B2 | 7/2014 | Stedman et al. |
| 2010/0001992 A1 | 1/2010 | Van Loenen et al. |
| 2010/0313050 A1* | 12/2010 | Harrat ............. G06F 1/3203 713/323 |
| 2011/0037734 A1* | 2/2011 | Pance ............. G06F 3/016 345/177 |
| 2012/0249416 A1 | 10/2012 | Maciocci et al. |
| 2013/0321346 A1 | 12/2013 | Tyler et al. |
| 2014/0111483 A1 | 4/2014 | Harrison et al. |
| 2014/0225824 A1 | 8/2014 | Shpunt et al. |
| 2015/0301615 A1* | 10/2015 | Kasar ............. G06F 3/017 345/156 |

FOREIGN PATENT DOCUMENTS

WO    2013165348    11/2013

\* cited by examiner

*Primary Examiner* — Albert Wang
(74) *Attorney, Agent, or Firm* — Andrew W. Chu; Craft Chu PLLC

(57) ABSTRACT

A control system includes a housing engaged to a mounting surface, a sensor contained within the housing, a microcontroller unit connected to the sensor, a server in communication with the sensor, and a terminal device in communication with the server. The system starts in an idle mode with the microcontroller having low power consumption. A gesture by a user associated with the mounting surface switches or toggles the operating mode of the control system into a ready mode. In the ready mode, the microcontroller has higher power consumption so as to connect the sensor to the server, and gestures by the user associated with the mounting surface can control the terminal device. The system alerts the switch in operating mode and filters background environment so only gestures are interpreted for switching operation mode or for issuing commands of the terminal device.

7 Claims, 4 Drawing Sheets

METHOD FOR REGULATING A SYSTEM FOR CONTROLLING A TERMINAL DEVICE

CROSS-REFERENCE TO RELATED APPLICATIONS

The present application claims priority under 35 U.S.C. Section 119(e) from U.S. Provisional Patent Application Ser. No. 62/131,575, filed on 11 Mar. 2015, entitled "METHOD FOR ACTIVATING AN INTERACTIVE ZONE TO DETECT GESTURES IN A CONTROL INTERFACE SYSTEM".

See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a control system for a terminal device, such as a television, lighting fixture, thermostat or laptop. More particularly, the present invention relates to method to regulate activity of the control system. Additionally, the present invention relates to a method to distinguish background environment and to manage power consumption.

2. Description of Related Art Including Information Disclosed Under 37 CFR 1.97 and 37 CFR 1.98.

With the development of electronic technology, output devices or terminal devices are used daily and are increasingly integrated with interactive features in order to enhance convenience and functionality. Users now can use a control system or controller, such as a remote control device, to adjust lights, curtains, a thermostat etc. Existing control systems include distinct remote control devices dedicated to and associated with the particular output or terminal device to be controlled. Remote control devices can also be associated with more than one terminal device, such as a master controller for electronics and a touchscreen computer tablet made integral with furniture or walls to control lighting and room temperature. Any computer with an interface (keyboard, mouse, touch pad or touchscreen) can be a remote control device for multiple terminal devices with smart technology. Mobile phones are also known to be enabled for controlling terminal devices, such as home security cameras and door locks. Another existing control system involves voice recognition technology.

Existing control systems have limitations. Each output or terminal device typically is associated with a respective remote control device, such as a controller for the cable box, a controller for the DVD player, and a controller for the sound mixer. An excessive number of controllers is needed in order to remotely control multiple devices. Furthermore, an individual controller is often misplaced or left in locations that are not readily accessible to the user. The user must search for a controller or change locations to access the controller. Additionally, voice recognition technology often requires cumbersome training sessions to calibrate for pronunciations and accents of each particular user. Furthermore, voice recognition technology is often impaired by background noise resulting in difficulties for that control system to recognize verbal commands. Additionally, the sound produced by voice commands may be obtrusive in many environments such as in a room where others are sleeping, or in a room while watching a movie.

For remote control devices associated with multiple terminal devices, for example, computer tablets with a touchscreen and computers with touchpads, remote control devices can be built into or integrated into furniture. Smart tables have been built with touchscreens that are able to receive touch-based gestures. In the case of integrating these touchscreen or touch pads into surfaces of structures such as furniture, the cost of the structure is significantly increased due to design modifications required to accommodate the remote control device, and the cost of the components and hardware. Furthermore, aesthetics are often affected. Appearances are altered when furniture, walls and surroundings are filled with touchscreens, touchpads, and other conspicuous devices. Integration of such hardware into furniture also requires the manufacturer to modify existing designs such that the hardware can be accommodated into the structure.

Prior art manual control systems range from buttons on a television remote controller to a touchscreen of a mobile phone. Simple gestures of pressing dedicated buttons and complex gestures of finger motions on a touchscreen are both used to control terminal devices. Various patents and publications are available in the field of these manual control systems.

U.S. Pat. No. 8,788,978, issued to Stedman et al on Jul. 22, 2014, teaches a gesture sensitive interface for a computer. The "pinch zoom" functionality is the subject matter, so that the detection of first and second interaction points, and the relative motion between the points are detected by sensors. A variety of sensors are disclosed to define the field, including a touch screen, camera, motion sensor, and proximity sensors.

World Intellectual Property Organization Publication No. WO2013165348, published for Bess on Nov. 7, 2013, describes a system with at least three accelerometers disposed in different locations of an area with a surface to capture respective vibration data corresponding to a command tapped onto the surface by a user. A processing system receives the vibration data from each accelerometer, identifying the command and a location of the user from the vibration data. A control signal based on the command and the location is generated.

U.S. Patent Publication No. 20140225824, published for Shpunt et al on Aug. 14, 2014, discloses flexible room controls. A control apparatus includes a projector for directing first light toward a scene that includes a hand of a user in proximity to a wall of a room and to receive the first light that is reflected from the scene, and to direct second light toward the wall so as to project an image of a control device onto the wall. A processor detects hand motions within the projected field.

U.S. Patent Publication No. 20120249416, published for Maciocci et al on Oct. 4, 2012, describes another projection system with gesture identification. The projector is a unit worn on the body of the user to project onto surfaces, such as walls and tables. Spatial data is detected by a sensor array. Additional rendering operations may include tracking movements of the recognized body parts, applying a detection algorithm to the tracked movements to detect a predetermined gesture, applying a command corresponding to the detected predetermined gesture, and updating the projected images in response to the applied command.

U.S. Patent Publication No. 20100019922, published for Van Loenen on Jan. 28, 2010, is the known prior art for an interactive surface by tapping. Sound detection is filtered and interpreted either in the system to be controlled or else in the sensors themselves. The direction of movement of a hand stroking the surface can be interpreted as a command to increase or decrease a parameter, such as the sound volume level of a television, for example. Determination of the position of the user's hand is unnecessary.

In other innovative systems, a control system can convert any independent mounting surface into a controller for a terminal device. A physically separate mounting surface, such as a wall or table surface, can be used to activate and deactivate a television or light fixtures, without the user touching either appliance. The control system includes a housing engaged to a mounting surface, a sensor and microcontroller unit within the housing, a server in communication with the sensor, and a terminal device in communication with the server. The terminal device is to be controlled by gestures associated with the mounting surface. The control system further includes a server in communication with the sensor, including but not limited to wifi, Bluetooth, local area network, wired or other wireless connection. The terminal device can be an appliance, lighting fixture or climate regulator.

For control systems, the various sensors, projectors, servers, routers, and lighted screens require power in order to remain active for receiving commands from the user. In order to regulate power consumption, the control system must be manually activated or deactivated. Some energy-saving modes lower brightness or dim a lighted screen, greatly reducing the ability to use the control system and still requiring manual switching to remove the energy-saving mode. For individuals with disabilities, a switch or a touchscreen may not be accessible, such as being mounted too high. Sufficient motor control to interact properly with a touchscreen may not be possible for individuals with neuromuscular problems or other physical constraints. Elderly individuals may also need assistance to adequately view buttons and touchscreens, when regulating control systems. The manual switch for operating a control system and the manual switch for operating in an energy save mode cause similar problems for individuals with different physical capabilities. There is a need to improve the control systems for all types of users with wide ranges of physical abilities.

It is an object of the present invention to provide a system and method for controlling a terminal device.

It is an object of the present invention to provide a method to regulate a system for controlling a terminal device.

It is an object of the present invention to provide a method to regulate a system for controlling a terminal device based on gestures, including but not limited to knocks.

It is an object of the present invention to provide a method to manage energy efficiency of an interactive control system based on gestures, including but not limited to knocks.

It is another object of the present invention to provide a method to regulate a control system between an idle mode and a ready mode.

It is still another object of the present invention to provide a method to regulate the control system with alerts for when the control system is in a ready mode.

It is yet another object of the present invention to provide a method to regulate the control system so that the terminal device is controlled with gestures, when the control system in a ready mode.

It is an object of the present invention to provide a method to regulate a system for controlling a terminal device over background environment.

It is an object of the present invention to provide a method for controlling a terminal device over background environment.

These and other objectives and advantages of the present invention will become apparent from a reading of the attached specification.

BRIEF SUMMARY OF THE INVENTION

Embodiments of the control system of the present invention can regulate the control system by gestures, so that a manual switch is not required for switching between an idle mode and a ready mode of the control system. The control system filters gestures from background environment. The control system converts any independent mounting surface into a regulator for the control system. The same control system can convert that mounting surface into a controller for a terminal device, when the control system in the ready mode only. A physically separate mounting surface, such as a wall or table surface, can be used to switch the control system between the idle mode and the ready mode. In the ready mode, the physically separate mounting surface can be used to control a television or light fixtures, without the user touching either appliance.

The control system includes a housing engaged to a mounting surface, a sensor within the housing, and a microcontroller unit connected to the sensor within the housing. In some embodiments, there is a server in communication with the sensor, and a terminal device in communication with the server. The control system itself is to be regulated by gestures associated with the mounting surface. For the ready mode, the terminal device is to be controlled by gestures associated with the mounting surface by the same control system. The idle mode corresponds to lower power consumption, and the ready mode corresponds to higher power consumption. For example, the connection to the server requires additional power so that the connection to the server is maintained only in the ready mode.

The sensor forms an interactive zone defined by a range of the sensor, and the interactive zone is aligned with the mounting surface. The interactive zone can be coplanar, overlaying or made integral with the mounting surface. The sensor is in a fixed position relative to the engagement means, so that a contact interaction with the mounting surface within the interactive zone is detected by the sensor as data signals. In an alternate embodiment, there can be more than one sensor. With an additional sensor, there is an additional interactive zone for detecting the same contact interaction on the mounting surface. The additional data signals from the additional sensor can be detected along with the data signals of the sensor.

The contact interaction generates the data signals of the sensor through the transmission portion of the housing. In some embodiments, the contact interaction is comprised of an impact or plurality of impacts on the mounting surface, the data signals having a respective defined peak corresponding to each impact, a measured time period between each defined peak, and a defined time period after a last defined peak. A data pattern for each contact interaction is determined by each defined peak and the defined time period after the last defined peak, and each measured time period between each defined peak, if there is a plurality of impacts. When the sensor is an acoustic sensor, the data signals are sound data, such as volume, intensity, pitch, frequency, and duration. When the sensor is an accelerometer, the data signals are vibration data, such as amplitude, intensity, and duration. Other sensors, such as sensors with mechanical, light, and piezoelectric capabilities can also be incorporated into the control system. Contact interactions, such as tapping, knocking, sweeping, and dragging, can be detected by the sensor as data signals, such that different gestures of a user can be used by the present invention for regulating the control system. In an alternate embodiment with more than one sensor, the data signals and the additional data signals can be used to determine the data pattern for the contact interaction.

The microcontroller of the present invention is connected to the sensor, including being mounted on the same printed circuit board in the housing. The microcontroller receives the data signals from the sensor and determines the data pattern corresponding to the data signals of the contact interaction. For more than one sensor, the data pattern corresponds to the data signals of the sensor and any additional data signals corresponding to other sensors. The microcontroller matches the data pattern with a mode gesture profile. The mode gesture profile is associated with a command to switch between the idle mode and the ready mode. Once matched, the switch is flipped, and the control system is in the desired operating mode.

Embodiments further include a server, and a terminal device. In the ready mode, the server can be connected to the sensors and the terminal devices so that subsequent data signals are received by the server and that the server determines the subsequent data pattern corresponding to the subsequent data signals of another contact interaction. The server matches the subsequent data pattern and a gesture profile, corresponding to a command for a terminal device. The terminal device can be an appliance, lighting fixture or climate regulator. Examples include a television, a thermostat, a computer, a software system, a game console, a smartphone, a device running software, a fan, a mattress adjustor, an alarm clock, and a lighting fixture. The microcontroller in communication with the server receives the command, and the means for initiating switches the mode between idle mode and ready mode. The means for initiating can be a switch or other actuating mechanism to change the status of the microcontroller. Now, the control system in the ready mode is ready to convert gestures into commands for terminal devices.

Embodiments of the present invention further include a method of regulating the control system of the present invention. A housing is installed on a mounting surface by an engagement device. The microcontroller is connected so as to be in communication with the sensor, and the server and the terminal device are connected so as to be in communication with the sensor. A physical impact is made on the mounting surface so as to generate a contact interaction, and the sensor detects the contact interaction as data signals. The microcontroller receives the data signals from the sensor and determines a data pattern corresponding to the data signals of the contact interaction. The data pattern is matched to a mode gesture profile associated with a command to switch between an idle mode and a ready mode. The command is transmitted to the microcontroller, so that the control system is set to the proper mode. The gesture related to the mounting surface regulates the control system, which can subsequently control a terminal device, even as the mounting surface is independent from the terminal device.

DETAILED DESCRIPTION OF THE INVENTION

The control system of the present invention is a manual control system for all types of users with wide ranges of physical abilities. Any independent mounting surface can be converted into a regulator for the control system and a controller for a terminal device. Simple gestures associated with the mounting surface can be used to switch operating modes of the control system and control the terminal device in a different location. Gaining access to a button or switch on a dedicated controller or being able to view and manipulate a complicated menu on a touchscreen are no longer required. The control system and any appliance, such as a television or a thermostat, can be activated or deactivated without physically touching either the control system or the appliance. The user does not have to physically reach the control system or the appliance as the terminal device. A separate mounting surface, such as a wall or table surface, is converted into a regulator for the control system and a controller without a touch-sensitive region boundary. Simple physical interactions on an independent surface can now regulate the control system and control the terminal device.

Figure 1:
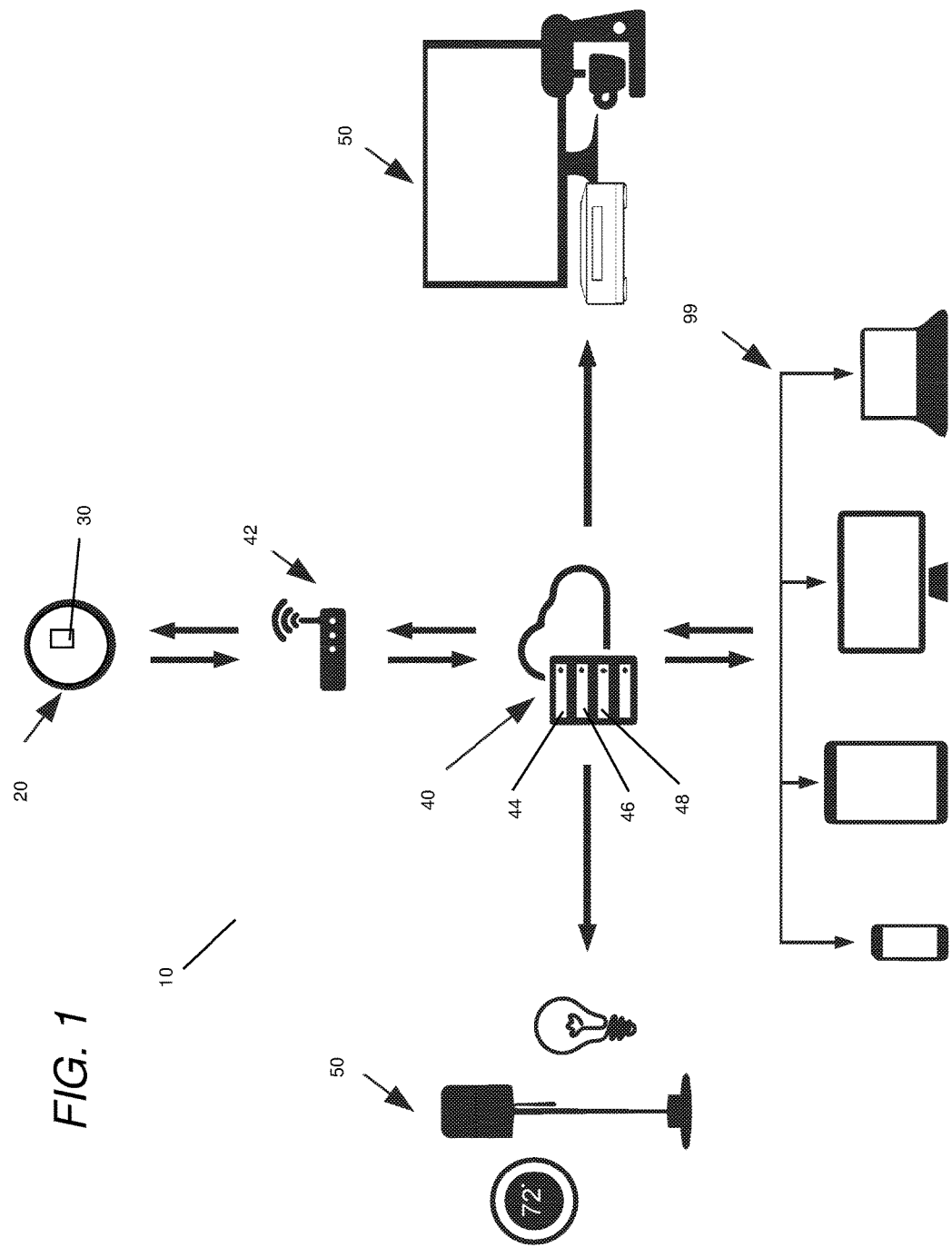
FIG. 1 is a schematic view of an embodiment of the control system of the present invention.
Figure 2:
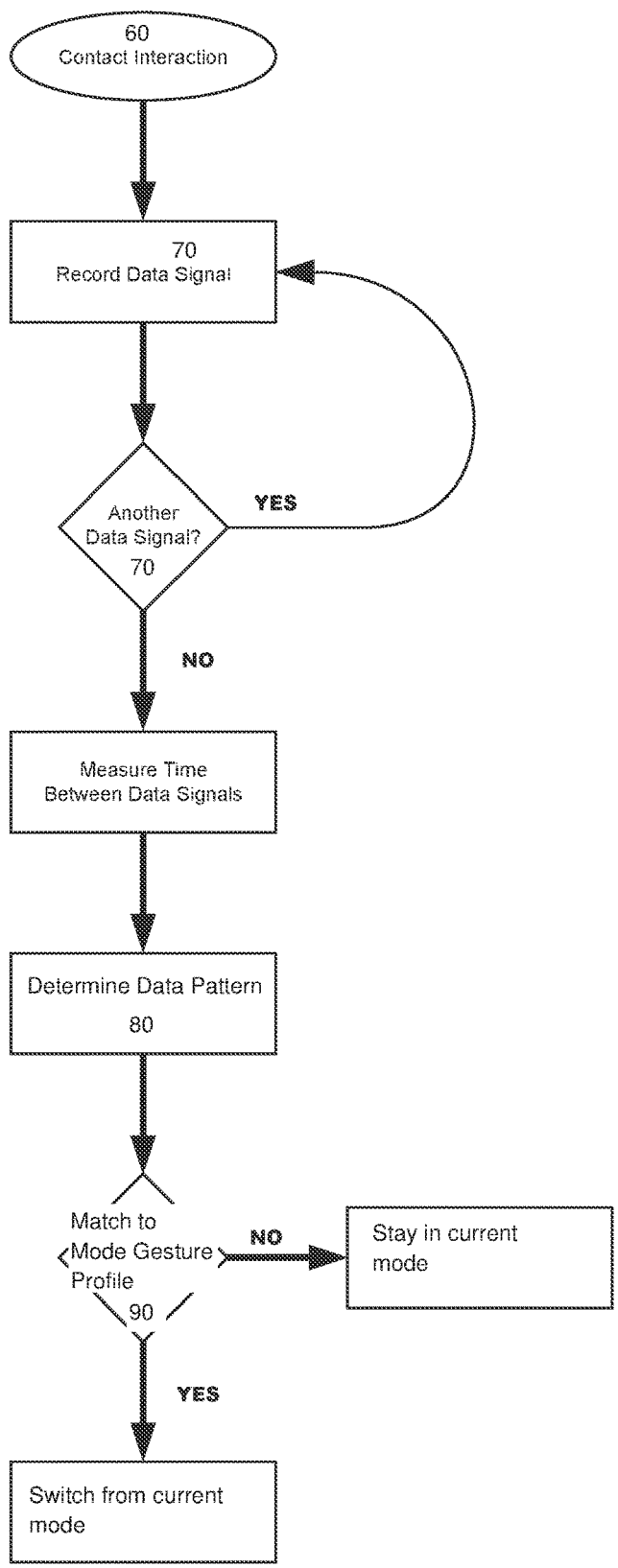
FIG. 2 is flow diagram of the embodiment of the method for regulating the control system of the present invention.

Referring to FIGS. 1-2, the control system 10 includes a housing 20 engaged to a mounting surface 22, a sensor 30 within the housing 20, a server 40 in communication with the sensor 30, and a terminal device 50 in communication with the server 40. Interfaces 99 are connected to the server 40 in order to interact with the control system 10. The interfaces 99 can include computers, laptops, tablets and smartphones. FIG. 1 shows a variety of different interfaces 99. The interfaces 99 allow the user to adjust the settings of the control system 10. Gestures by a user associated with the mounting surface 22 regulate the control system 10 and control the terminal device 50 in FIGS. 5 and 7-9. In some embodiments, the devices that are interfaces 99 could also be terminal devices 50.

Figure 3:
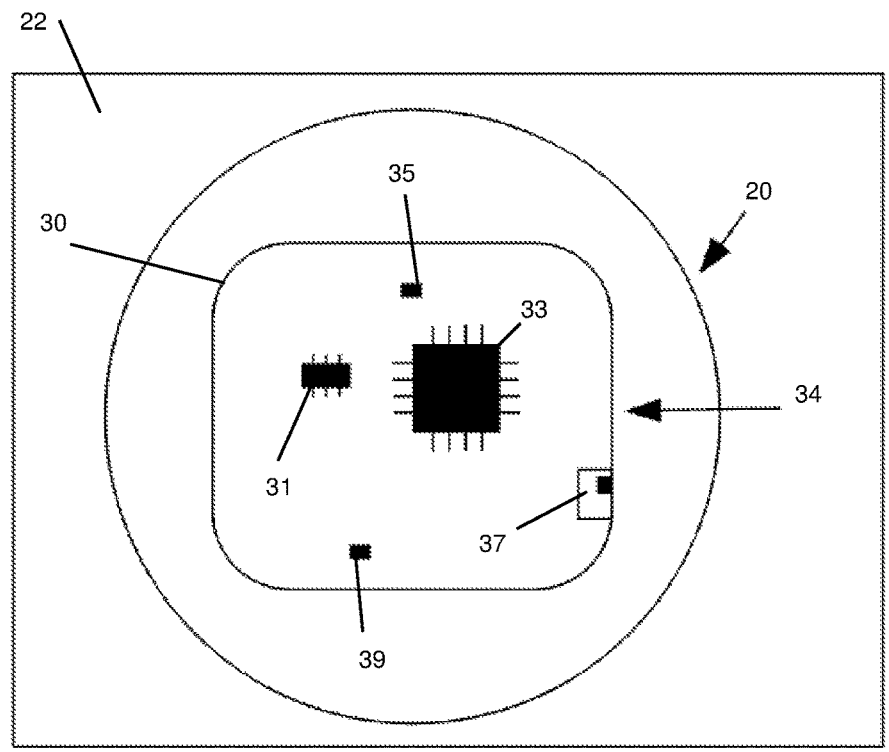
FIG. 3 is a schematic view of an embodiment of the housing and sensor of the control system of the present invention.
Figure 4:
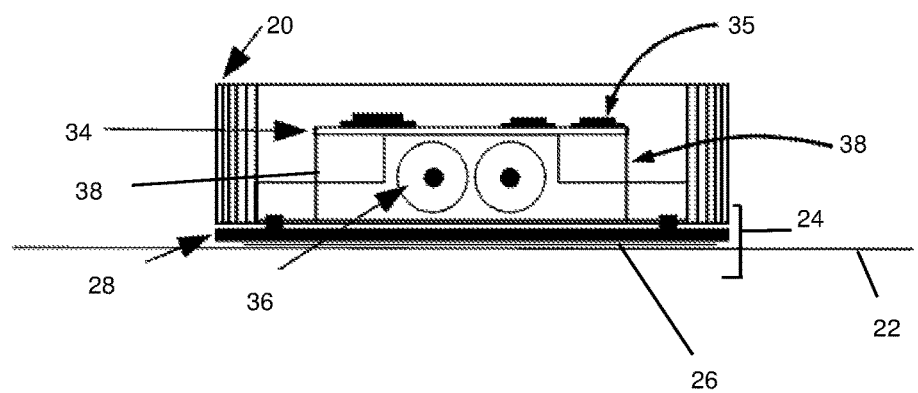
FIG. 4 is a side elevation view of the embodiment of the housing and sensor of FIG. 3.

In FIGS. 3-4, the housing 20 is comprised of an engagement means 24 for a mounting surface 22. Planar surfaces, such as tables and walls, as well as non-planar surfaces, such as beds, can be mounting surfaces 22. FIG. 4 shows an embodiment of the engagement means 24 being comprised of an attachment means 26 between the housing 20 to the mounting surface 22 and a transmission portion 28 connecting the sensor 30 to the housing 20. The attachment means 26 can be an adhesive, mechanical fasteners, threaded screws or other components to hold the housing 20 to the mounting surface 22. In some embodiments, the transmission portion 28 can be comprised of frames and brackets 38 or a spring loaded portion (not shown) so as to reduce damping. There is a rigid positioning of the sensor 30 relative to the mounting surface 22 through the housing 20. Any sound or vibration of the mounting surface 22 is transmitted to the sensor 30. The engagement means 24 attaches the sensor 30 and reduces damping so that sensor 30 more accurately detects the mounting surface 22. The transmission portion 28 affects sound or vibration or other stimuli from the mounting surface 22 to the sensor 30.

The control system 10 of the present invention includes a sensor 30 as shown in FIGS. 3-4. The housing 20 contains the sensor 30 comprised of a printed circuit board 34 with a flash memory 31, microcontroller unit (MCU) 33, the sensor unit 35, antenna 37, and light emitting diode 39. The sensor unit 35 can be an accelerometer or acoustic sensor. The microcontroller unit 33 and antenna 35 can have wifi capability for communication with the server 40. The microcontroller unit 33 is connected to the sensor unit 35 and the flash memory 31. The relationship between the sensor unit 35 of the sensor 30 and the transmission portion 28 of the housing 20 is shown. The rigid position of the sensor 30 establishes the transmission of the contact interaction to the sensor 30. Other parts in the housing 20 include batteries 36 as a known power supply for the control system 10. The stable construction of the housing 20 and the sensor 30 enable the accurate and efficient conversion of the gestures into commands for the terminal device 50.

The engagement means 24 of the housing 20 is cooperative with the sensor 30 so that any contact interaction generates data signals of the sensor through the transmission portion 28 of the engagement means 24. There is less damping of the contact interaction as sound or vibration. The transmission portion 28 can have less damping than the mounting surface 22 or the actual surface of the knocking in the interactive zone 32. In some embodiments, the transmission portion 28 affects transmission of the data signal to the sensor 30. The rigid position of the sensor 30 relative to the mounting surface 22 reduces damping of the contact interaction through the transmission portion 28. The transmission portion 28 can be comprised of a rigid material, such an injection molded frame with flexibility different than the materials of the mounting surface 22 or surface of the contact interaction, if different from the mounting surface 22. In the embodiment with the spring loaded portion (not shown), the spring loaded portion of the transmission portion 28 has less damping than the mounting surface 22 or surface of the contact interaction, if not the same. Sound or vibration has less damping through a spring loaded portion for the transmission of the contact interaction through the transmission portion 28 to the sensor 30. For example, the spring loaded portion as the transmission portion 28 may hold the housing 20 closer and stronger to the mounting surface 22 so as to reduce damping sound or vibration of contact interaction. The data signals of the sensor 30 may have improved clarity and accuracy than systems without the relationship of the sensor 30 within the housing 20 relative to the mounting surface 22 for transmission through to the sensor 30. The sensor 30 can be stabilized relative to the housing 20 on both sides of the printed circuit board 34. Alternatively, the printed circuit board 34 may be held along multiple points along the perimeter of the printed circuit board 34, including brackets spaced every 120 degrees or ever 90 degrees. The sensor 30 is held in position to prevent flopping and vibrating separate from the mounting surface so that the sensor 30 maintains the proper relationship to the mounting surface 22.

FIG. 2 is a flow diagram of an embodiment of the present invention, showing the data signals of the sensor 30 in relation to the microcontroller unit 33. The contact interaction 60 generates the data signals 70 of the sensor 30 through the transmission portion 28 of the housing 20. In the present invention, the contact interaction 60 is comprised of an impact or plurality of impacts associated with the mounting surface 22. In some embodiments, the impact or plurality of impacts on the associated surface is the contact interaction 60, not an impact on the mounting surface 22. The impacts are coordinated or correspond or translate to the mounting surface 22 for detection by the sensor 30 through the mounting surface 22 as data signals 70.

In the embodiments of the control system 10, the data signals 70 having a respective defined peak corresponding to each impact, a measured time period between each defined peak, and a defined time period after a last defined peak. Each peak is a distinct spike in the data being detected with a quick increase from a baseline or background activity. A data pattern 80 for each contact interaction 60 is determined by each defined peak and the defined time period after the last defined peak, and each measured time period between each defined peak, if there is a plurality of impacts. FIG. 2 shows an embodiment for the contact interaction 60 comprised of one impact or a plurality of impacts. A single knock or a sequence of knocks can be a contact interaction 60. The control system 10 determines the data pattern 80 for contact interactions 60 comprised of a single tap, three quick knocks, two taps, and other sequences. Contact interactions 60, such as tapping, knocking, sweeping, and dragging, can be detected by the sensor 30 as data signals 70. Different gestures of a user can be used by the present invention for controlling activity of the terminal device 50.

A sensor 30 of the present invention can be any known sensor with the same relationship to the other components of the control system 10. The sensor may be a mechanical sensor, a light sensor, piezoelectric sensor, a vibration sensor, or other type of meter. In one embodiment, the sensor 30 is comprised of an acoustic sensor, such that the data signals 70 are comprised of sound data of the contact interaction 60. The sound data can be at least one of volume, intensity, pitch, frequency, duration and a combination thereof. In another embodiment, the sensor 30 is comprised of an accelerometer, such that the data signals 70 are comprised of vibration data of the contact interaction 60. The vibration data can be at least one of amplitude, intensity, duration, and a combination thereof. The data pattern 80 can be determined from data signals 70 of either sound data or vibration data.

FIG. 3 shows an embodiment of the sensor 30 with the sensor unit 35 in communication with the microcontroller unit 33 and flash member 31. The communication can be hardwired with the components of the printed circuit board 34 physically connected. According to FIG. 2, the microcontroller unit 33 receives the data signals 70 from the sensor 30. These data signals 70 correspond to the contact interaction 60 associated with the mounting surface 22. The microcontroller unit 33 determines the data pattern 80 corresponding to the data signals 70 of the contact interaction 60. The microcontroller unit 33 also matches the data pattern 80 with a mode gesture profile 90. The mode gesture profile 90 is associated with a switch command to change the operating mode of the control system 10. The control system 10 in the idle mode has lower power consumption as an energy saving or sleep mode. However, control system 10 remains able to detect the contact interaction 60 corresponding to the mode gesture profile 90. The control system 10 in the ready mode has higher power consumption as an active or awake mode. The control system 10 can power the microcontroller unit 33 to connect to the server 40 in the ready mode. The control system 10 remains able to detect the contact interaction 60 corresponding to the mode gesture profile 90 in the ready mode, such that the control system 10 can toggle between modes by gestures. An elderly person in a wheelchair is able to regulate turning on or turning off the control system 10 by knocking twice on a tabletop instead of locating a dedicated button on the housing 20. The control system 10 is not required to maintain high power consumption to connect to the server 40, while remaining accessible and available to individuals of all physical abilities.

The embodiments of FIGS. 1 and 2 show the server 40 in communication with the sensor 30, when the system is in ready mode. The communication can be wireless or wired. The connection between the server 40 and the sensor 30 can include a router 42, as shown in FIG. 1, and may also include wifi, Bluetooth, local area network, or other connections. In FIG. 1, the server 40 can be comprised of a routing module 44, a processing module 46 being connected to the routing module 44, and an output module 48 connected to the processing module 46.

Figure 5:
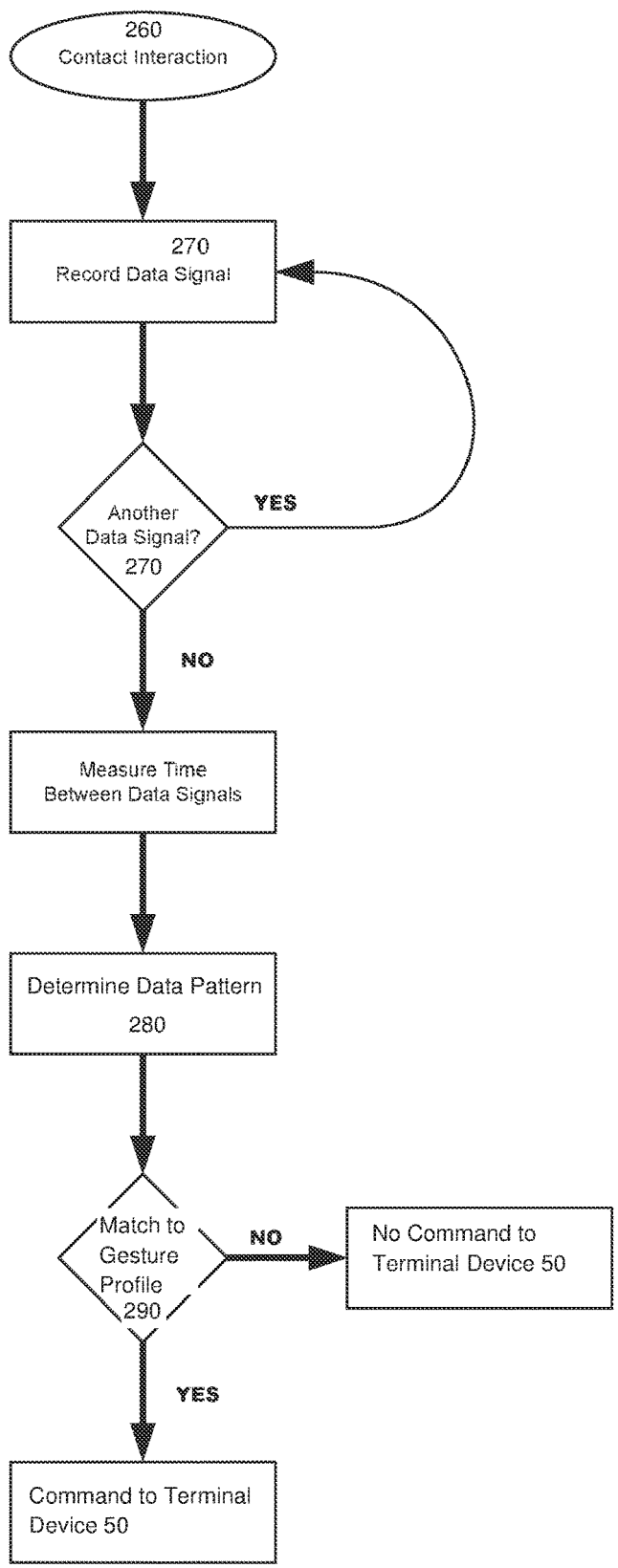
FIG. 5 is flow diagram of the embodiment of the method for controlling a terminal device in the ready mode, according to the present invention.

The flow chart of FIG. 5 shows the control system 10 in ready mode for controlling activity of a terminal device 50. The routing module 44 receives the subsequent data signals 270 from the sensor 30. These subsequent data signals 270 correspond to another contact interaction 260 associated with the mounting surface 22, when the control system 10 is in the ready mode. The processing module 46 determines the subsequent data pattern 280 corresponding to the subsequent data signals 270 of the other contact interaction 260. The processing module 46 also matches the subsequent data pattern 280 with a gesture profile 290. The gesture profile 290 is associated with a command for the terminal device 50, such as power off or change channels or dim intensity. Then, the output module 48 transmits the command to the terminal device 50. For example, when the terminal device 50 is a television, another contact interaction 260 of three fast knocks can be detected as subsequent data signals 270 to generate a subsequent data pattern 280. The subsequent data pattern 280 can be matched to a gesture profile 290 associated with changing channels up one channel. The output module 48 communicates the command to change channels up one channel through the server 40 to the television as the terminal device 50. Thus, that same elderly person in a wheelchair is able to activate the control system 10 by knocking so that the person can change channels by knocking twice on a tabletop instead of locating a dedicated button on the television or fiddling with a touchscreen on a smartphone.

In the control system 10, the terminal device 50 can be an appliance, such as a television, stereo or coffee machine. Alternatively, the terminal device 50 may be a device running software, a light or climate regulator, such as a thermostat, fan or lighting fixture. The activity of the terminal device 50 depends upon the terminal device 50. The activity is dedicated to the particular terminal device 50. The command associated with the gesture profile 290 relates to the particular terminal device 50. Knocking twice on a tabletop can be converted by the control system 10 into a command to change channels on a television or to lower the temperature of a thermostat or to create an entry in an online calendar software program on a computer. The control system 10 can also be used with multiple terminal devices 50. A gesture profile 90 for a command is specific for an activity for a particular terminal device 50. More than one terminal device 50 can be connected to the server 40 to receive the commands from the sensor 30.

Alternative embodiments include a control system with additional sensors. The housing could contain a plurality of sensors. With an additional sensor, there is an additional interactive zone for detecting the same contact interaction 60 or 260 on the mounting surface. The additional interactive zone is defined by an additional range of the additional sensor. The contact interaction 60 or 260 associated with the mounting surface within the additional interactive zone is detected by the additional sensor as additional data signals 70 or 270, and the microcontroller unit 33 or server 40 determines the respective data pattern 80 or 280 corresponding to the data signals and additional data signals 70 or 270. The respective data pattern 80 or 280 can be more robust for more reliable matching with a mode gesture profile 90 or gesture profile 290. Background interference and resolution can be filtered with more consistency.

Embodiments of the present invention include the method of regulating the control system 10 in FIGS. 2 and 3. The method includes installing a housing 20 on a mounting surface 22 by an engagement device 24 with the sensor 30 contained within the housing 20. The sensor 30 forms an interactive zone 32 defined by a range 34 of the sensor 30 and aligned with the mounting surface 22. The method further comprises connecting a microcontroller unit 33 in communication with the sensor 30 or sensor unit 35. The control system 10 starts in an idle mode as its operating mode.

A physical impact is made associated with the mounting surface 22 and within the interactive zone 32 so as to generate a contact interaction 60. The contact interaction 60 is detected as data signals 70 by the sensor 30. The data signals 70 are sent from the sensor 30 to the microcontroller unit 33. The microcontroller unit 33 determines a data pattern 80 corresponding to the data signals 70 of the contact interaction 60. The data pattern 80 is matched to a mode gesture profile 90 with the microcontroller unit 33. Each mode gesture profile 90 is associated with a command for the control system 10. For example, the command to switch operating modes changes the operating mode from idle mode to ready mode, when the control system 10 starts in idle mode. The method can toggle between idle mode and ready mode by contact interactions 60 matching the mode gesture profile 90.

Alternative embodiments include making a plurality of physical impacts associated with the mounting surface 22, such that the contact interaction 60 is more than one physical impact and the data pattern 80 is determined by more than one impact. Still another embodiment includes the housing containing an additional sensor. With a plurality of sensors, the step of determining the data pattern 80 further comprises determining the data pattern corresponding to the data signals 70 and the additional data signals.

In the ready mode, the method further comprises controlling a terminal device 50 with the control system 10 as shown in FIGS. 1 and 2. The method further comprises connecting a server 40 in communication with the sensor 30, and connecting a terminal device 50 in communication with the server 40.

A physical impact is made associated with the mounting surface 22 and within the interactive zone 32 so as to generate a contact interaction 260, when the control system 10 is in ready mode. The contact interaction 260 is detected as subsequent data signals 270 by the sensor 30. The subsequent data signals 270 are sent from the sensor 30 to the server 40. In some embodiments, the server 40 is comprised of a routing module 44, a processing module 46 being connected to the routing module 44, and an output module 48 connected to the processing module 46. Furthermore, the terminal device 50 can have a receiving module 52. The subsequent data signals 270 are received with the routing module 44 of the server 40, and the processing module 46 determines a subsequent data pattern 280 corresponding to the subsequent data signals 270 of the contact interaction 260. The subsequent data pattern 280 is matched to a gesture profile 290 with the processing module 46. Each gesture profile 290 is associated with a command, depending upon the terminal device 50. The command is designated for the particular terminal device 50, such as changing channels for a television or lowering temperature for a thermostat. The method includes transmitting the command to the receiving module 52 of terminal device 50 with the output module 48 of the server 40. Then, the terminal device 50 performs the activity according to the command.

Embodiments of the method include the mode gesture profile being comprised of a threshold level for the data pattern. Any data pattern above the threshold level matches the mode gesture profile. For example, with the sensor as an acoustic sensor to measure frequency, the mode gesture profile may be a data pattern with a frequency higher than 300 Hz. With a threshold level, background environment is filtered so that a background noise does not toggle the control system 10 into a ready mode. The threshold level can preserve energy savings with the control system 10 drawing less power in the idle mode.

Further embodiments of the method of regulating include the step of generating an alert. When the control system 10 switches between operating modes, the user needs to be informed. A feedback response to the switch can be emitted, including any tactile, audible, visual or other perceivable alert. The type of alert may be adjusted for the abilities of an individual so as to account for hearing impairments and other different capabilities.

The mode gesture profile 90 is comprised of at least one of a set of mode data patterns stored in the flash memory unit 31 contained within the housing 20. The flash memory unit 31 has a smaller capacity than the server 40, so the size of the set is limited. The number of stored mode data patterns is relatively low, so the number of commands of the control system 10 to be detected in the idle mode is low. There can be other control system 10 commands besides toggling between idle mode and ready mode. Since the control system 10 in the idle mode consumes less power, there can only be a smaller amount of mode gesture profiles to be stored and searched. The method of regulating the control system 10 remains separate from the server 40 and any energy required for connection to the server is avoided. In contrast, the gesture profile 290 is comprised of at least one of a set of data patterns stored in the server 40. The server 40 can store much more, including different data patterns for different terminal devices. The two sets are maintained separately, and a user may be able to personalize the set of data patterns available on the server 40 for a particular control system 10. The mode gesture profile 90 and gesture profile 90 are distinct from background environment, such as television noise, tremors from passing vehicles, and other sounds or vibrations that are not intended to register a command for the control system or a command for the terminal device.

The present invention provides a method for regulating a system that controls a terminal device. The method regulates a control system by controlling an operating mode of the control system. The control system is in an idle mode or a ready mode. The idle mode corresponds to a lower power consumption for an energy savings mode, and the ready mode corresponds to a higher power consumption for active control of a terminal with the control system. The method of regulating includes toggling or switching between modes of the control system based on gestures, including but not limited to knocks. Manual gestures can regulate the control system so that a manual switch or button is not required. Individuals of all physical abilities are able to regulate the control system. The constraints of fine motor control to slide a small switch or height to reach a light switch are removed, so that all users can utilize the control system.

The idle mode saves energy, so that the control system can remain active in an efficient manner. The idle mode is a type of sleep mode so that the control system is partially active. The control system can still detect some gestures, even in the idle mode. In some embodiments, the control system is also based on gestures. In the ready mode, the control system enables knocking, tapping, and other gestures to control a terminal device. The gesture detection for the regulation of the control system can be extended into different terminal devices. The power consumption for the control system to control a terminal device in the ready mode is greater than the power consumption for the control system in the idle mode. Gestures can be used to regulate the power consumption and corresponding activity of the control system.

In some embodiments, the present invention provides an interactive control system to be regulated based on gestures to address the different physical abilities of all possible users. The control system enables knocking, tapping, and other gestures as physical impacts on an independent surface to control the operating mode of the system and then to control a device without the accessibility and complexity disadvantages of the prior art. An exterior surface independent from the terminal device becomes a regulator and controller. Contact interactions associated with the mounting surface and within the interactive zone of the sensor are detected as data signals for conversion into commands to regulate the system and actual performance of an activity by a terminal device.

The present invention also provides alerts for when the control system is in a ready mode. The user can be notified that the control system is activated. The alerts can confirm the switch to ready mode. Different types of alerts can be adjusted for the abilities of the user, such as a visual signal for a hearing impaired person. The gestures can be filtered by the mode gesture profile and gesture profile to be distinguished from background environment. Extraneous and unintentional gestures can be screened so that the user has a desired level of control. In some versions, a filter may be a threshold level, such that a minimum amount of vibration is required to switch from idle mode to ready mode. The settings can change for each user, and the user's abilities or preferences or both.

As described herein, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

The foregoing disclosure and description of the invention is illustrative and explanatory thereof. Various changes in the details of the illustrated structures, construction and method can be made without departing from the true spirit of the invention.

We claim:

1. A method of regulating a system for controlling a terminal device, the method comprising the steps of:
    installing a housing on a mounting surface by an engagement device, said housing being comprised of a sensor contained within said housing and a microcontroller unit connected to said sensor, said sensor forming an interactive zone defined by a range of said sensor, said interactive zone being aligned with said mounting surface, said sensor being in a fixed position relative to said engagement device, said microcontroller unit having a first power consumption level so as to be in an idle mode;
    making a physical impact on said mounting surface so as to generate a contact interaction;
    detecting said contact interaction as data signals with said sensor;
    receiving said data signals from said sensor with said microcontroller unit;
    determining a data pattern corresponding to said data signals of said contact interaction with said microcontroller unit;
    matching said data pattern to a mode gesture profile with said microcontroller unit, said mode gesture profile being associated with a command to switch said microcontroller unit from said idle mode to a ready mode, said ready mode corresponding to said microcontroller unit having a second power consumption level, said second power consumption level being higher than said first power level; and
    controlling a terminal device, when said microcontroller unit is in said ready mode; and
    switching between said idle mode and said ready mode by each contact interaction resulting in respective data patterns matched to said mode gesture profile,
    wherein the step of controlling said terminal device further comprises the steps of:
    connecting a server in communication with said sensor through said microcontroller unit, said server being comprised of a routing module, a processing module being connected to said routing module, and an output module connected to said processing module;
    connecting said terminal device in communication with said server, said terminal device being comprised of a receiving module;
    making another physical impact on said mounting surface so as to generate said another contact interaction;
    detecting said another contact interaction as subsequent data signals with said sensor;
    receiving said subsequent data signals from said sensor with said routing module of said server;
    determining a subsequent data pattern corresponding to said subsequent data signals of said contact interaction with said processing module;
    matching said subsequent data pattern to a gesture profile with said processing module, said gesture profile being associated with a command;
    transmitting said command to said receiving module of terminal device with said output module of said server, said command corresponding to activity of said terminal device; and
    performing said activity with said terminal device.

2. The method of regulating, according to claim 1, wherein said mode gesture profile is comprised of a threshold level for said data pattern, wherein any data pattern above said threshold level matches said mode gesture profile.

3. The method of regulating, according to claim 1, wherein the step of making a physical impact on said mounting surface further comprises making a plurality of physical impacts on said mounting surface, said contact interaction being associated with more than one physical impact.

4. The method of regulating, according to claim 1, wherein said housing is further comprised of an additional sensor, said additional sensor being connected to said microcontroller unit,
    wherein the step of detecting said contact interaction as data signals with said sensor further comprises detecting said contact interaction as additional data signals with said additional sensor;
    wherein the step of receiving said data signals from said sensor with said microcontroller unit further comprises receiving said additional data signals from said additional sensor with microcontroller unit, and
    wherein the step of determining said data pattern further comprises determining said data pattern corresponding to said data signals and said additional data signals with said microcontroller unit.

5. The method of regulating, according to claim 1, further comprising:
    generating an alert corresponding to each step of toggling between said idle mode and said ready mode.

6. The method of regulating, according to claim 1, wherein said mode gesture profile is comprised of at least one of a set of mode data patterns stored in a flash memory unit contained within said housing, and wherein each data pattern is comprised of a respective defined peak corresponding to a respective contact interaction, a defined time period after a last defined peak so as to match corresponding data signals, when said respective contact interaction is detected by said sensor.

7. A method of regulating a system for controlling a terminal device, the method comprising the steps of:
    installing a housing on a mounting surface by an engagement device, said housing being comprised of a sensor contained within said housing and a microcontroller unit connected to said sensor, said sensor forming an interactive zone defined by a range of said sensor, said interactive zone being aligned with said mounting surface, said sensor being in a fixed position relative to said engagement device, said microcontroller unit having a first power consumption level so as to be in an idle mode;
    making a physical impact on said mounting surface so as to generate a contact interaction;
    detecting said contact interaction as data signals with said sensor;
    receiving said data signals from said sensor with said microcontroller unit;
    determining a data pattern corresponding to said data signals of said contact interaction with said microcontroller unit;

matching said data pattern to a mode gesture profile with said microcontroller unit, said mode gesture profile being associated with a command to switch said microcontroller unit from said idle mode to a ready mode, said ready mode corresponding to said microcontroller unit having a second power consumption level, said second power consumption level being higher than said first power level; and controlling a terminal device, when said microcontroller unit is in said ready mode; and switching between said idle mode and said ready mode by each contact interaction resulting in respective data patterns matched to said mode gesture profile, wherein the step of controlling said terminal device further comprises the steps of:

connecting a server in communication with said sensor through said microcontroller unit, said server being comprised of a routing module, a processing module being connected to said routing module, and an output module connected to said processing module;

connecting said terminal device in communication with said server, said terminal device being comprised of a receiving module;

making another physical impact on said mounting surface so as to generate said another contact interaction;

detecting said another contact interaction as subsequent data signals with said sensor;

receiving said subsequent data signals from said sensor with said routing module of said server;

determining a subsequent data pattern corresponding to said subsequent data signals of said contact interaction with said processing module;

matching said subsequent data pattern to a gesture profile with said processing module, said gesture profile being associated with a command;

transmitting said command to said receiving module of terminal device with said output module of said server, said command corresponding to activity of said terminal device; and performing said activity with said terminal device, and wherein said gesture profile is comprised of at least one of a set of data patterns stored in said server.

* * * * *